ZERO ACCELERATION CHARGES

ONE—HALF MAXIMUM ACCELERATION CHARGES

March 2, 1971     R. C. STAATS     3,566,700
CONTROL APPARATUS

Filed Dec. 5, 1966     3 Sheets-Sheet 3

INVENTOR.
ROBERT C. STAATS
BY
Roger W. Hensen
ATTORNEY 3,566,700
Patented Mar. 2, 1971

3,566,700
CONTROL APPARATUS
Robert C. Staats, Fridley, Minn., assignor to
Honeywell Inc., Minneapolis, Minn.
Filed Dec. 5, 1966, Ser. No. 599,213
Int. Cl. G01c 19/04
U.S. Cl. 74—5    4 Claims

ABSTRACT OF THE DISCLOSURE

The present invention pertains to inertial instruments and more particularly to gyroscopes and accelerometers whose inertial members are suspended in electric fields between a plurality of electrodes. Specifically, the present invention provides an improved electric field suspension system based on digital techniques.

BACKGROUND OF THE INVENTION

The technique of supporting an inertial member by means of electric fields is well known in the art and various schemes have been devised to exploit the inherent advantages which electric field suspension offers. An example is Pat. 3,003,356 to Nordseck. The most obvious advantage thus gained is the elimination of physical contact between the inertial member and its support. This results in a drastic reduction, if not complete elimination, of errors caused by friction in the support bearing. All prior art electrostatic suspension systems, however, are based on analog techniques in their rebalance loops. Thus, upon application of a force along a particular axis through the inertial instrument, the voltage or current amplitude at the supporting electrodes adjacent to one side of the member is increased and the voltage or current amplitude at the opposite side is correspondingly decreased.

SUMMARY OF THE INVENTION

The present invention teaches a novel means for achieving greater accuracy in the rebalance of the member by incorporating a digital technique. Rather than varying the voltage or current ampltiude, the present system distributes the energy from a single source between two electrodes of a pair, located at diametrically opposite sides of member support structure. This is accomplished by switching the source in a controlled time relationship to one or the other of the electrodes, while the amplitude remains substantially constant.

Since the output of the electric energy source, preferably a charge source, is switched between two electrodes, only one source per axis is required instead of two, as is the case for example in the apparatus of co-pending application Ser. No. 242,549, filed on Dec. 5, 1962, and assigned to the present assignee. The output transformer is usually the largest component of the electrostatic suspension. The present system allows two electrodes to share a single transformer, thereby eliminating three of these components and significantly reducing the systems size and weight.

The present system is compatible with three-phase suspension concepts, because the output of the charge source is continuous and the sum of the charges is constant. The secondary winding of the output transformer may also be resonated with the load to hold power consumption to a minimum.

The source frequency is maintained constant so that each output pulse represents a specific force increment. Only complete number, never a fraction, of pulses are applied to each electrode. The frequency difference between the two electrodes of a pair is consequently directly proportional to the acceleration along the axis of the pair. No squaring, multiplying, or other signal processing is required to obtain a digital output indicative of acceleration. It also follows directly that the sum of the forces at any pair of electrodes is constant. This means that the sum of the squares of the rotor-electrode gradients is automatically maintained constant without requiring any additional circuitry or signals. The result of this is further simplification of the over-all suspension and reduction of its physical size.

Additional advantage is gained by the present system because only one reference voltage is required for all three axes. For accuracy comparable to conventional inertial accelerometers, the reference voltage may be provided by a Zener diode.

It is further possible, by use of proper logic in the error signal processing, to greatly increase the band-width of the suspension system. Better over-all tolerance to external vibrations will as a result be possible.

It is therefore an object of the persent invention to provide a digital electric field suspension for the inertial member of an inertial instrument.

A more specific object of the present invention is to provide means in combination with a constant amplitude pulse source for distributing the pulses from said source between two electrodes of an electrode pair, whereby an inertial member is supported between said electrodes and the difference in the number of pulses supplied to the respective electrodes is indicative of the acceleration along the axis of the electrode pair.

These and further objects will become more apparent to those skilled in the art upon examination of the following specification, claims, and drawings.

BRIEF DESCRIPTION OF THE DRAWINGS

FIG. 4 represents in block diagram form a three-axes suspension system incorporating three pairs of supporting electrodes and three channels of suspension electronics of the type shown in FIG. 1.

DESCRIPTION OF THE PREFERRED EMBODIMENT

Figure 1:
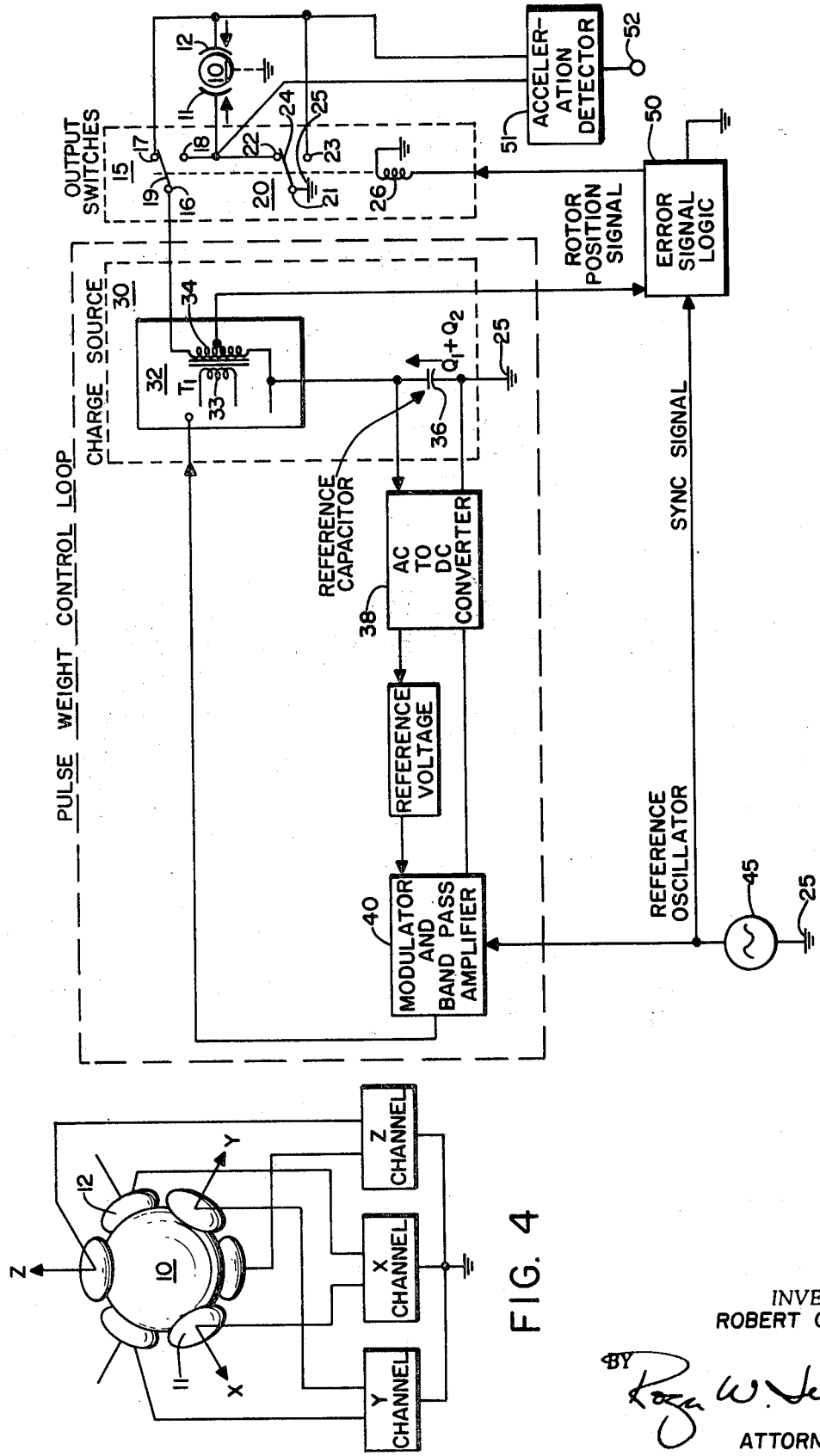
FIG. 1 is a schematic diagram representation of one channel of an electric field suspension according to the present invention.

Referring now to FIG. 1, a single channel of support electronics is illustrated. An inertial member 10 is supported between a pair of electrodes 11 and 12 by means of electrostatic fields. The single channel illustrated in FIG. 1 provides one axis of support. To achieve three axes of support, three such channels are necessary together with three pair of electrodes. A three axis suspension system is illustrated in block diagram form in FIG. 4.

A pair of switches 15 and 20 are shown. Switch 15 has a common terminal 16 and output terminals 17 and 18, as well as a movable arm 19 which can be moved to provide connection between the common terminal and one or the other of the output terminals. Switch 20 has a common terminal 21 and a pair of output terminals 22 and 23. Switch 20 further has a movable arm 24 which may be moved to connect the common terminal 21 to either output terminal 22 or output terminal 23. Output terminals 18 and 22 of switches 15 and 20 respectively are connected directly to support electrode 11 and output terminals 17 and 23 are connected directly to support electrode 12. Common terminal 16 of switch 15 is connected to the output of a charge source 30, while common terminal 21 of switch 20 is connected to reference potential terminal 25. Switches 15 and 20 are operated in unison so that in a first position electrode 11 is connected to ground potential terminal 25, while electrode 12 is connected to the output of charge source 30 and in the other state electrode 12 is connected to ground terminal 25 and electrode 11 is connected to charge source 30. By controlling switches 15 and 20 it is possible to regulate the relative amount of electric energy received by electrodes 11 and 12.

Charge source 30 has an AC sinusoidal output and may be a current amplifier. At its output, the charge source has a transformer 32 with a primary winding 33 and a secondary output winding 34. Primary winding 33 is connected to the output of the AC current amplifier. Output winding 34 has one end connected directly to common terminal 16 of switch 15. The other end of secondary winding 34 is connected to one end of a reference capacitor 36. The other end of capacitor 36 is connected to ground potential terminal 35. Secondary winding 34 furthermore has an intermediate tap.

Charge source 30 is so named because it maintains a voltage across reference capacitor 36 equal to its input signal. Since the reference capacitor is in series with the load, and the load is capacitive, the same charge that flows through the load must also flow through the reference capacitor. If the voltage across the reference capacitor is maintained constant, its charge is constant. It follows, that the charge on electrodes 11 and 12 must also be constant. Charge source 30, or current amplifier, incorporates a large amount of negative feedback to make the electrode charge independent of instantaneous changes in rotor-to-electrode capacitance.

To insure long-term stability of the electrode charge source, a second negative feedback loop is also provided. The ends of reference capacitor 36 are connected to the input of an AC to DC converter 38. The DC output of converter 38 is applied to the input of a modulator and bandpass amplifier 40. The output of amplifier 40 is applied to the input of charge source 30.

A reference oscillator 45 is provided, having one end connected to ground potential terminal 25 and having its output connected to the input of amplifier 40 and also to the input of an error signal logic circuit 50. The function of error logic circuit 50 is to receive an input indicative of the rotor displacement from the center of the electrode cavity and to provide an output signal for controlling switches 15 and 20 in a manner to bring rotor 10 back to its preferred central position. Error signal logic 50 has an input connected to the intermediate tap of secondary winding 34 on transformer 32. Switches 15 and 20 may be relays, as illustrated in FIG. 1. The output of logic 50 is used to control energizing winding 26 of the relay which controls switches 15 and 20. A somewhat more detailed description of a suitable error signal logic circuit is found with reference to FIG. 5.

An acceleration detector 51 is provided with two inputs, connected to electrodes 11 and 12 respectively. The function of detector 51 is to sense the number of pulses being supplied to each of the two electrodes of the pair and to provide an output signal at its output 52 which is indicative of acceleration. The acceleration indicative signal may be derived by finding the ratio of the number of pulses received by one electrode with respect to the number received by the other electrode of the pair. Since, however, the combined number of pulses to the two electrodes of a pair is constant, it should be noted that the rate at which pulses are supplied to each electrode is in itself indicative of the magnitude and direction of acceleration.

Figure 5:
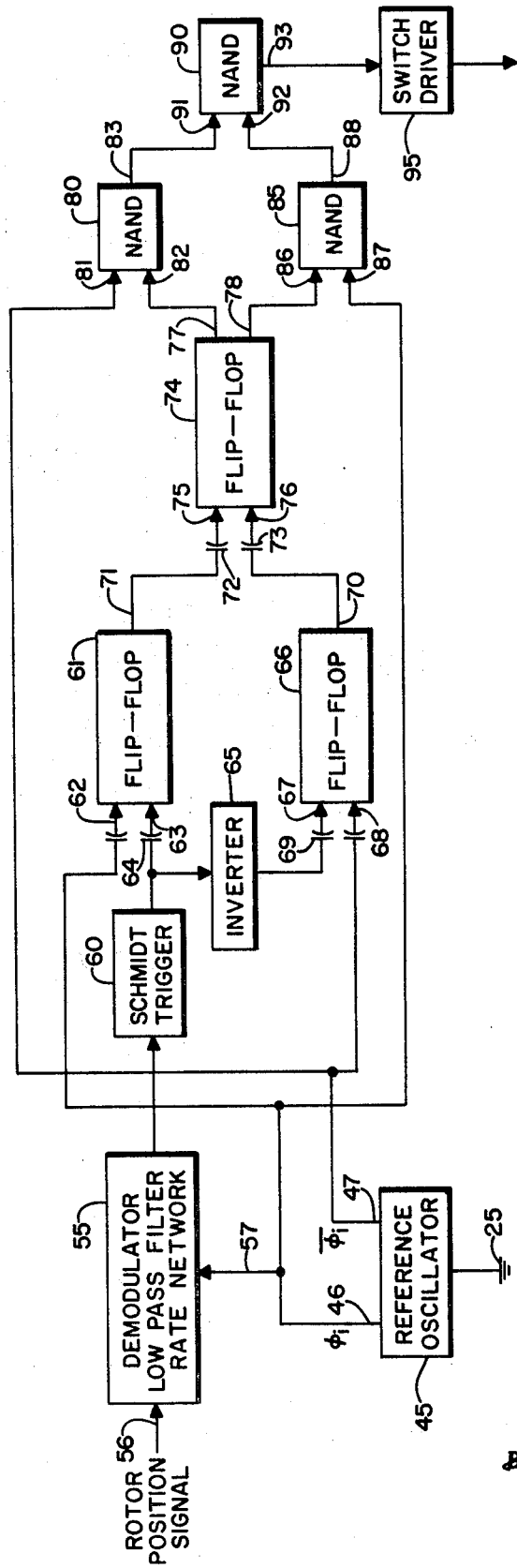
FIG. 5 illustrates a possible arrangement for the error signal logic of FIG. 1.

In FIG. 5 a block 55 is shown, representing a demodulator, a low pass filter, and a rate network. Circuit 55 has an input 56 for connection to intermediate tap of secondary winding 34 in the apparatus of FIG. 1. Network 55 further has a second input 57 for connection to an output of reference oscillator 45. Reference oscillator 45 has outputs 46 and 47 at which appear output signals of equal frequency but of 180° relative phase displacement. Network 55 has an output connected to an input of a Schmitt trigger 60. The output of Schmitt trigger 60 is connected to an input of an inverter 65 and one end of a capacitor 64. The other end of capacitor 64 is connected to input 63 of a flip-flop circuit 61. Flip-flop circuit 61 further has a second input 62 and an output 69. The output of inverter 65 is connected to one side of a capacitor 69, whose other side is connected to input 67 of a flip-flop 66. Flip-flop 66 further has a second input 68 and an output 70. Output 71 of flip-flop 61 is connected through a capacitor 72 to an input 75 of a flip-flop 74. Flip-flop 74 further has a second input 76 and outputs 77 and 78. Output 70 of flip-flop 66 is connected, through a capacitor 73, to input 76 of flip-flop 74.

A NAND circuit 80 is shown with inputs 81 and 82 and an output 83. Input 82 of NAND circuit 80 is connected to output 77 of flip-flop 74, while input 81 is connected to output 47 of reference oscillator 45. Output 47 of oscillator 45 is further connected to input 68 of flip-flop 66.

NAND circuit 85 is provided with inputs 86 and 87 and an output 88. Input 86 of NAND circuit 85 is connected to output 78 of flip-flop 74 and input 87 is connected to output 46 of reference oscillator 45. Output 46 of oscillator 45 is furthermore connected to input 62 of flip-flop 61.

NAND circuit 90 is shown with inputs 91 and 92 and an output 93. Input 91 is connected to output 83 of NAND circuit 80 and input 92 is connected to output 88 of NAND circuit 85. Output 93 of NAND circuit 90 is connected to the input of a switch driver 95, whose function it is to operate switches 15 and 20 illustrated in FIG. 1.

OPERATION

With switches 15 and 20 in the position shown in FIG. 1, electrode 12 is energized from charge source 30. As the charge on electrode 12 increases, rotor 10 is pulled by electrostatic attractive force closer to electrode 12. The change in the electrode-to-rotor capacitance due to the displacement of rotor 10 is reflected by the level of the voltage at intermediate tap of secondary winding 34 on transformer 32. The level of this voltage is the signal used by error logic 50 to operate switches 15 and 20 in a manner to drive rotor 10 back towards the center of the electrode cavity. As the rotor moves closer to electrode 12, the signal at intermediate tap of winding 34 acts through error signal logic 50 to reverse the state of switches 15 and 20. As the state of switches 15 and 20 is reversed, the flow of energy from charge source 30 to electrode 12 is discontinued and is directed to electrode 11. This results in an increased attractive force between rotor 10 and electrode 11, thus pulling rotor 10 back away from electrode 12 towards the center of the electrode cavity. Switches 15 and 20 are being switched continuously so that as rotor 10 is displaced from the center of the electrode cavity as the result of an external acceleration force, or as a result of internal electric fields, the rotor is continually being pulled back toward a preferred position at the center of the electrode cavity.

Figure 2:
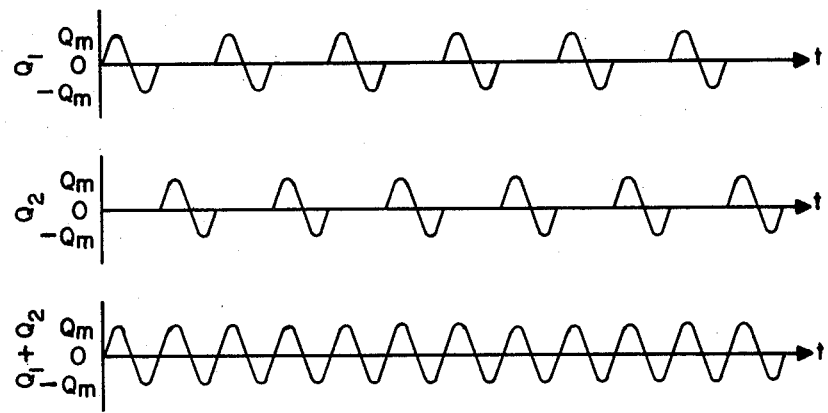
FIG. 2 is a graphical representation of pulses supplied to each of two electrodes of a pair when the acceleration force along the axis of the electrode pair, to which the inertial instrument is subjected, is zero.

Charge source 30 provides an AC output of uniform pulses. The error signal logic 50 is arranged so that the switching occurs only at the end of the full cycle. Each electrode, therefore, always receives an integral number, never a fraction, of energy pulses from source 30. If no external acceleration forces are present, the pulses will be distributed in equal numbers between the two electrodes of a pair. This is illustrated graphically in FIG. 2. The top line of FIG. 2 illustrates the charge $Q_1$ applied to a first electrode and line 2 represents the charge $Q_2$ applied to the second electrode of a pair. It can be seen that during zero acceleration switching occurs at the completion of each full cycle.

Figure 3:
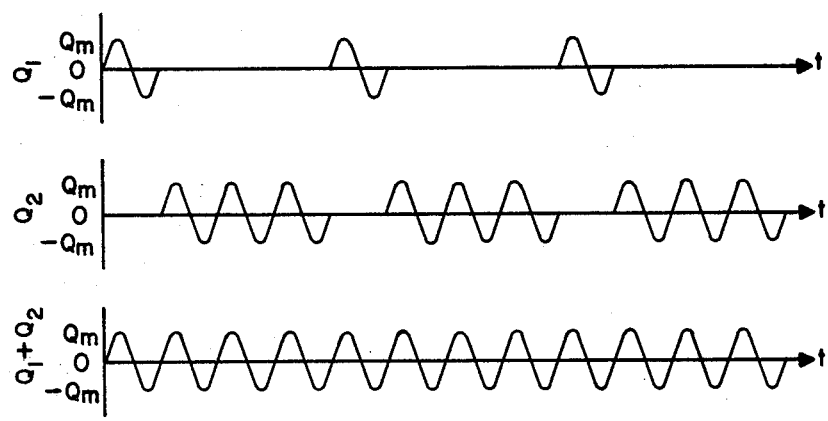
FIG. 3 is a graphical representation of pulse distribution when a net acceleration does exist.

FIG. 3 illustrates graphically the distribution of charges from source 30 during the presence of an external acceleration force. The pulse ratio is adjusted just sufficiently to offset exactly the acceleration force and to thus maintain rotor 10 exactly at the center of the electrode cavity.

Clearly the error signal logic could take many forms. A particular embodiment which has been mechanized and shown feasible is that illustrated in FIG. 5. The voltage from intermediate tap of winding 34, whose level is proportional to the rotor position, is applied to input 56 of network 55. Network 55 is comprised of a demodulator, a low pass filter, and a rate network. At the output of network 55 will appear a DC signal whose level is proportional to the level of the AC signal at the intermediate tap of winding 34. The demodulator reference is derived from reference oscillator 45 and is applied to input 57 of network 55. The DC output of network 55 is applied to a Schmitt trigger 60 whose function it is to provide a first output when its input is raised above a certain positive level, and to provide a second output when its input is lowered below a certain negative level. The first and second outputs may be represented, as is often done, by a "1" and a "0" respectively. If the input is between the upper and the lower levels, the Schmitt trigger output will remain at its former level. The output of Schmitt trigger 60 is applied to the input 63 of flip-flop 61 and to input 67 of flip-flop 66. The signal applied to input 67 of flip-flop 66 is inverted by inverter 65. The inputs to flip-flops 61, 66, and 74 are capacitively coupled, so that the flip-flops are not responsive to the level of the input signal, but only to the change of the signal level. The flip-flops are designed to change their state only when the input signal drops from a higher to a lower value. In other words. the state of the flip-flop is changed only when a negative-going signal is presented at one of its inputs. The reference signals from outputs 46 and 47 of reference oscillator 45 are applied to the other AC inputs 62 and 68 of flop-flops 61 and 66 respectively. The outputs of flip-flops 61 and 66 are applied to the inputs of flip-flop 74. As in the case of flip-flops 61 and 66, the inputs to flip-flop 74 are capacitively coupled and a change in the state of the output signal occurs only upon the presence of a negative-going input signal.

When the output of Schmitt trigger 60 changes state, this information is loaded into either flip-flop 61 or 66, depending upon the polarity of the signal. If the output signal of Schmitt trigger 60 increases, the positive-going signal cannot change the state of flip-flop 61. Through inverter 65, however, the positive-going signal is converted into a negative-going signal, the effect of which is to set flip-flop 66. A negative-going signal at the output of Schmitt trigger 60 will set flip-flop 61, but will have no effect on the state of flip-flop 66. When flip-flop 61 or 66 are set, the signal at the respective outputs is raised to the higher positive value. Since a positive-going signal has no effect at the input flip-flop 74, flip-flop 74 will not react to the setting of either flip-flop 61 or 66. Depending on the past history of the system, the information remains stored in the particular flip-flop until the next-zero crossing of the reference signal from reference oscillator 45, whereupon the information is transmitted onto flip-flop 74. The output of flip-flop 74 represents the direction of rotor displacement in the electrode cavity synchronized to the nearest complete cycle of reference oscillator 45. The outputs of flip-flop 74 and the reference signals from reference oscillator 45 are gated through NAND gates 80, 85 and 90, so that the output of gate 90 is a square wave signal with a phase relationship representing the direction of the rotor displacement. The output square wave is then fed to switch driver 95 to operate switches 15 and 16 in the manner described previously and illustrated graphically in FIGS. 2 and 3.

While I have shown a particular embodiment of the present invention, other modifications and improvements will become obvious to those skilled in the art. It is, therefore, understood that a specific embodiment of my invention shown here is for purpose of illustration only, and that my invention is limited only by the scope of the appended claims.

What is claimed is:

1. A digitally controlled electric field support for the inertial member of an inertial instrument, said support comprising:
  a housing;
  a pair of electrically isolated electrodes mounted on said housing at diametrically opposite locations in said housing;
  an electrically conductive member positioned between said pair of electrodes, said member having a perferred central position;
  a switching means having first and second output terminals a common terminal and a control means for connecting said common terminal alternatively to said first or said second output terminals;
  means connecting said first output terminal of said switching means to one of said electrodes and means connecting said second output terminal to the other of said electrodes of said electrode pair;
  a charge source providing an output of uniform, equally spaced electric energy pulses;
  means connecting the output of said charge source to said common terminal of said switching means;
  position sensing means adapted for sensing and providing an output indicative of the direction of displacement of said member from its preferred central position; and
  switch control means connected to said position sensing means and to said control means of said switching means for operating said switching means as a function of member displacement to continually force said member toward its preferred central position.

2. Apparatus according to claim 1, wherein, means is provided for synchronizing said switch control means with said charge source to allow switching only at the completion of a pulse from said source, whereby an integral number of pulses are provided to each of said electrodes.

3. Apparatus according to claim 2, wherein means are provided for sensing the numbeor of pulses being provided to each of said two electrodes of said pair and providing an output indicative of the acceleration to which said inertial instrument is being subjected.

4. An inertial instrument comprising:
  a housing having insulative means defining a hollow cavity;
  three pairs of electrically insulated electrodes mounted on said insulative means of said housing, the two electrodes of each pair being arranged in diametric opposition to each other along one of three mutually orthogonal axes intersecting substantially at the geometric center of said cavity;
  an electrically conductive member positioned within said cavity; and
  means connecting to said electrodes for establishing electric forces between said member and said electrodes to maintain said member in suspension between said electrodes free of contact with said electrodes said means for providing the supporting forces along each of said axes including,
    one of said pairs of electrodes,
    a source of uniform electrical pulses, and said two electrodes of said pair for electrically connecting said source to one or the other of said electrodes;
    rotor position sensing means for sensing the off-center displacement of said rotor along said axis; and
    means connected to said rotor position sensing means and to said switching means to operate said switching means as a function of rotor position and to distribute said pulses in integral number between said first and second electrodes in accordance with the rebalance requirements along said axis, whereby said member is continually forced toward the center of said cavity, the difference in the number of pulses provided to one of the electrodes and the number provided to the other electrode of the pair being indicative of the acceleration to which the inertial instrument is being subjected.

References Cited
UNITED STATES PATENTS 3,003,356  10/1961  Nordseick _____ 74—5
3,098,679  7/1963  DeBoice _____ 308—8

ROBERT F. STAHL, Primary Examiner

U.S. Cl. X.R.

308—8